(12) United States Patent
Gu et al.

(10) Patent No.: US 11,438,790 B2
(45) Date of Patent: Sep. 6, 2022

(54) WIRELESS COMMUNICATION METHOD AND ELECTRONIC DEVICE SUPPORTING SAME

(71) Applicant: Samsung Electronics Co., Ltd., Suwon-si (KR)

(72) Inventors: Jaheon Gu, Suwon-si (KR); Hyunkee Min, Suwon-si (KR); Jaeho Song, Suwon-si (KR); Jongmu Choi, Suwon-si (KR); Sunkey Lee, Suwon-si (KR); Gwangmin Kim, Suwon-si (KR); Mincheol Jeong, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/270,720

(22) PCT Filed: Aug. 23, 2019

(86) PCT No.: PCT/KR2019/010770
§ 371 (c)(1),
(2) Date: Feb. 23, 2021

(87) PCT Pub. No.: WO2020/040596
PCT Pub. Date: Feb. 27, 2020

(65) Prior Publication Data
US 2021/0352520 A1    Nov. 11, 2021

(30) Foreign Application Priority Data

Aug. 23, 2018    (KR) .................... 10-2018-0098827

(51) Int. Cl.
*H04W 28/02*    (2009.01)
*H04W 8/20*     (2009.01)
*H04W 72/10*    (2009.01)

(52) U.S. Cl.
CPC ......... *H04W 28/0268* (2013.01); *H04W 8/20* (2013.01); *H04W 72/10* (2013.01)

(58) Field of Classification Search
CPC . G06F 9/451; H04L 43/0852; H04L 47/2466; H04L 47/2475; H04L 61/2007;
(Continued)

(56) References Cited

U.S. PATENT DOCUMENTS 8,458,357 B2 *  6/2013  Menchaca ............. H04L 67/322
                                                          709/232
9,332,968 B2    5/2016  Skakoon
(Continued)

FOREIGN PATENT DOCUMENTS

KR    10-2009-0114042 A    11/2009
KR    10-2014-0116099 A    10/2014
(Continued)

OTHER PUBLICATIONS

Extended European Search Report dated Sep. 21, 2021, issued for the corresponding in European Patent Application No. 19852743.4-1213.

*Primary Examiner* — Khoa Huynh
(74) *Attorney, Agent, or Firm* — Jefferson IP Law, LLP

(57) ABSTRACT

According to an embodiment disclosed in the specification, an electronic device may include a display, a wireless communication circuit, a processor, and a memory storing a first application program having a first priority associated with use of a resource of the wireless communication circuit and a second application program having a second priority associated with the use of the resource. The memory may store instructions that cause the processor to execute the first application program, to execute the second application program, to compare the first priority with the second priority when the first application program is displayed on the display, and to cause the first application program to have a (Continued)

priority the same as the second application program or to have a priority higher than the second application program, based at least partly on the comparison.

15 Claims, 9 Drawing Sheets

(58) Field of Classification Search
CPC ....... H04L 67/322; H04L 67/34; H04L 67/36; H04M 1/72403; H04W 8/20; H04W 28/0268; H04W 72/10
See application file for complete search history.

(56) References Cited

U.S. PATENT DOCUMENTS

| | | | |
|---|---|---|---|
| 9,350,624 B2 | 5/2016 | Shakhmetov et al. |
| 9,411,640 B2 | 8/2016 | Park |
| 9,602,627 B2 | 3/2017 | Welsh et al. |
| 9,661,440 B2 | 5/2017 | Tembey et al. |
| 9,743,447 B2 | 8/2017 | Kim et al. |
| 9,819,469 B2 | 11/2017 | Horn et al. |
| 10,581,581 B2 | 3/2020 | Horn et al. |
| 2008/0049846 A1* | 2/2008 | Nagafuji .......... H04N 21/64322 375/240.28 |
| 2010/0332667 A1 | 12/2010 | Menchaca et al. |
| 2010/0333028 A1 | 12/2010 | Welsh et al. |
| 2013/0182607 A1 | 7/2013 | Kim et al. |
| 2013/0182644 A1 | 7/2013 | Kim et al. |
| 2015/0003435 A1 | 1/2015 | Horn et al. |
| 2015/0064080 A1 | 3/2015 | Skakoon |
| 2015/0106502 A1 | 4/2015 | Shakhmetov et al. |
| 2015/0186179 A1 | 7/2015 | Park |
| 2016/0029146 A1 | 1/2016 | Tembey et al. |
| 2016/0212653 A1 | 7/2016 | Wang et al. |
| 2017/0318619 A1 | 11/2017 | Kim et al. |
| 2018/0062819 A1 | 3/2018 | Horn et al. |
| 2019/0364492 A1 | 11/2019 | Azizi et al. |
| 2020/0205062 A1 | 6/2020 | Azizi et al. |

FOREIGN PATENT DOCUMENTS

| | | |
|---|---|---|
| KR | 10-2015-0080859 A | 7/2015 |
| KR | 10-2017-0003475 A | 1/2017 |
| KR | 10-2017-0037606 A | 4/2017 |
| KR | 10-2018-0066270 A | 6/2018 |
| WO | 2018/125686 A2 | 7/2018 |

* cited by examiner

WIRELESS COMMUNICATION METHOD AND ELECTRONIC DEVICE SUPPORTING SAME

TECHNICAL FIELD

Various embodiments disclosed in this specification relate to a wireless communication method and an electronic device supporting the same.

BACKGROUND ART

An electronic device such as a smartphone, a tablet personal computer (PC), or a laptop PC may perform various functions by executing applications. For example, the electronic device may launch a call app, a browser app, a video app, a music app, or a game app to perform a function of a voice call, web search, video playback, music playback, or real-time game execution.

The electronic device may be connected to a network through wireless communication to transmit and receive data associated with the execution of the application. For example, the electronic device may be connected to a network by using cellular communication (e.g., 3G, 4G (or LTE) or 5G) or wireless local area network (WLAN) (e.g., wireless fidelity (Wi-Fi)).

DISCLOSURE

Technical Problem

In WLAN environments, a conventional electronic device may not select an access category (hereinafter, referred to as "AC") for managing quality of service (QoS), and may transmit data to an external device depending on a priority determined depending on data traffic. When an application such as a real-time game is running, a priority of data transmission to the application may be low. In this case, data associated with the application may be processed with delay, and it is inconvenient for a user to utilize the application.

Technical Solution

According to an embodiment disclosed in the specification, an electronic device may include a display, a wireless communication circuit, a processor operatively connected to the display and the wireless communication circuit, and a memory operatively connected to the processor and storing a first application program having a first priority associated with use of a resource of the wireless communication circuit and a second application program having a second priority associated with the use of the resource. The memory may store instructions that cause the processor to execute the first application program, to execute the second application program, to compare the first priority with the second priority when the first application program is displayed on the display, and to cause the first application program to have a priority the same as the second application program or to have a priority higher than the second application program, based at least partly on the comparison.

Advantageous Effects

According to various embodiments disclosed in the specification, an electronic device may change AC of QoS by using a list of applications to be processed with low latency.

According to various embodiments disclosed in the specification, the electronic device may increase a transmission priority of a packet when an application such as a real-time game operates in the foreground. Furthermore, the electronic device may increase communication efficiency in WLAN environments by lowering the transmission priority of a packet generated by another application under a specified condition.

According to various embodiments disclosed in the specification, the electronic device may change a transmission priority of a packet when an application such as a real-time game is switched from the foreground to the background. Besides, a variety of effects directly or indirectly understood through the specification may be provided.

Figure 1:
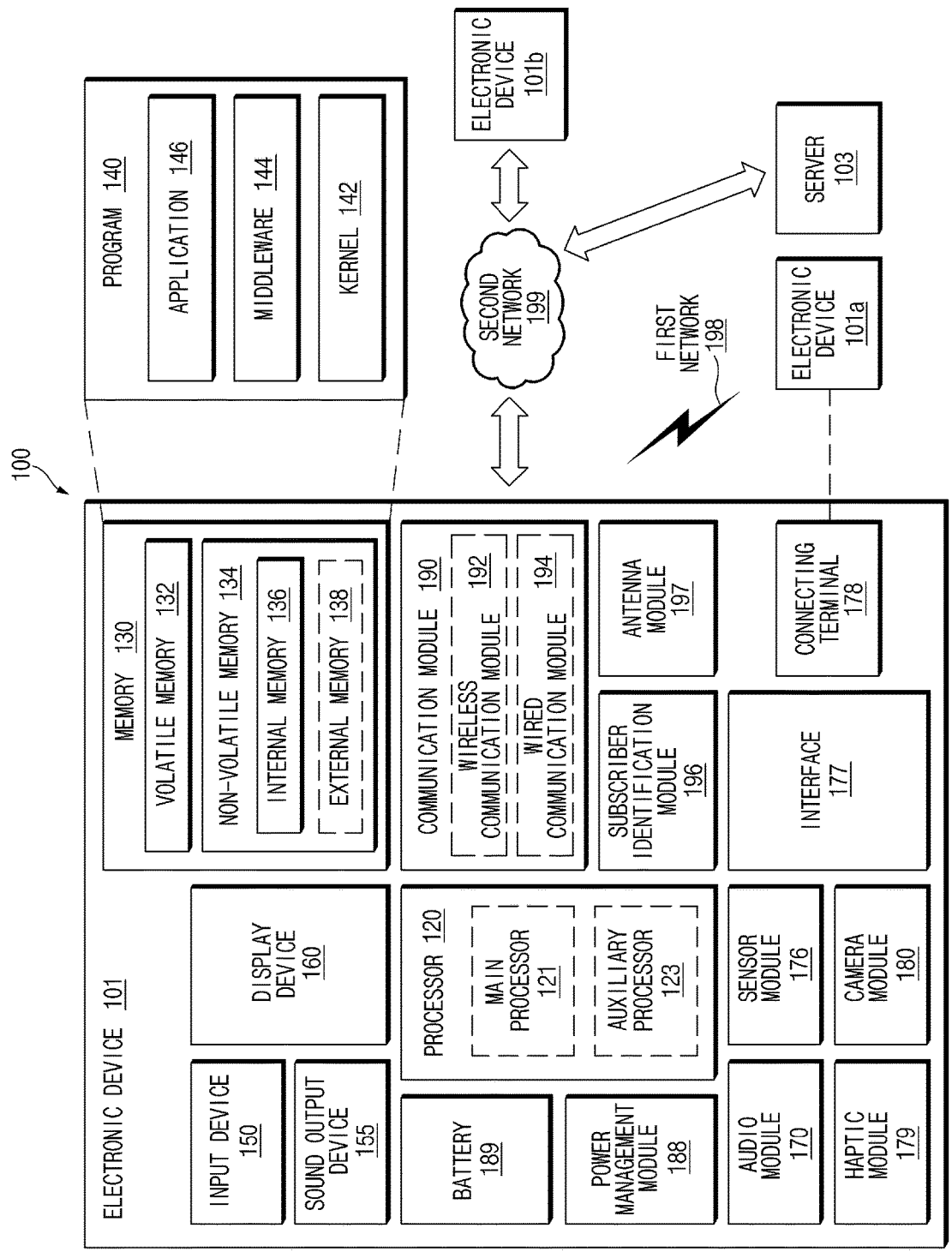
FIG. 1 is a block diagram illustrating an electronic device in a network environment, according to various embodiments.

With regard to description of drawings, the same or similar components will be marked by the same or similar reference signs.

MODE FOR INVENTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

FIG. 1 is a block diagram of an electronic device 101 in a network environment 100 according to various embodiments. Referring to FIG. 1, the electronic device 101 may communicate with an electronic device 101a through a first network 198 (e.g., a short-range wireless communication network) or may communicate with an electronic device 101b or a server 103 through a second network 199 (e.g., a long-distance wireless communication network) in a network environment 100. According to an embodiment, the electronic device 101 may communicate with the electronic device 101b through the server 103. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, or an antenna module 197. According to some embodiments, at least one (e.g., the display device 160 or the camera module 180) among components of the electronic device 101 may be omitted or one or more other components may be added to the electronic device 101. According to some embodiments, some of the above components may be implemented with one integrated circuit. For example, the sensor module 176 (e.g., a fingerprint sensor, an iris sensor, or an illuminance sensor) may be embedded in the display device 160 (e.g., a display).

The processor 120 may execute, for example, software (e.g., a program 140) to control at least one of other components (e.g., a hardware or software component) of the electronic device 101 connected to the processor 120 and may process or compute a variety of data. According to an embodiment, as a part of data processing or operation, the processor 120 may load a command set or data, which is received from other components (e.g., the sensor module 176 or the communication module 190), into a volatile memory 132, may process the command or data loaded into the volatile memory 132, and may store result data into a nonvolatile memory 134. According to an embodiment, the processor 120 may include a main processor 121 (e.g., a central processing unit or an application processor) and an auxiliary processor 123 (e.g., a graphic processing device, an image signal processor, a sensor hub processor, or a communication processor), which operates independently from the main processor 121 or with the main processor 121. Additionally or alternatively, the auxiliary processor 123 may use less power than the main processor 121, or is specified to a designated function. The auxiliary processor 123 may be implemented separately from the main processor 121 or as a part thereof.

The auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive (e.g., sleep) state or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123.

The memory 130 may store a variety of data used by at least one component (e.g., the processor 120 or the sensor module 176) of the electronic device 101. For example, data may include software (e.g., the program 140) and input data or output data with respect to commands associated with the software. The memory 130 may include the volatile memory 132 or the nonvolatile memory 134.

The program 140 may be stored in the memory 130 as software and may include, for example, a kernel 142, a middleware 144, or an application 146.

According to various embodiments, at least a portion of the kernel 142 or the middleware 144 may be referred to as an operating system. The kernel 142 may control or manage, for example, system resources (e.g., processor 120 or the memory 130) used to execute an operation or a function implemented in other programs (e.g., the middleware 144, or the application program 146). In addition, the kernel 142 may provide an interface for controlling or managing the system resources by accessing individual components of the electronic device 101 from the middleware 144 or the application program 146.

The kernel 142 may include, for example, a system resource manager and/or a device driver. The system resource manager may perform control, allocation, or retrieval of system resources. According to an embodiment, the system resource manager may include a process managing part, a memory managing part, or a file system managing part. The device driver may include, for example, a display driver, a camera driver, a Bluetooth driver, a shared memory driver, an USB driver, a keypad driver, a Wi-Fi driver, an audio driver, or an inter-process communication (IPC) driver.

The middleware 144 may serve, for example, as an intermediary so that the application program 146 communicates with the kernel 142 to exchange data. In addition, the middleware 144 may process one or more job requests received from the application program 146 according to priority. For example, the middleware 144 may give priority to at least one of the application programs 146 to use system resources (e.g., the processor 120 or the memory 130) of the electronic device 101, and process the one or more work requests.

According to various embodiments, the application program 146 may transmit information about an application operating in a foreground state to the kernel 142 through the middleware 144. When the kernel 142 receives identification information about the application operating in the foreground state from the application programs 146, the kernel 142 may store the identification information. When the packet transmitted from the application program 146 includes the identification information, the kernel 142 may change the priority of accessing the channel for the packet. For example, the priority of the packet may be changed from AC_BE (best effort), AC_VO (voice), or AC_VI (video).

Hereinafter, the operation of the kernel 142, the middleware 144, or the application program 146 may mean that programs or instructions related to the kernel 142, the middleware 144, or the application program 146 are loaded into the processor 120, and the processor 120 performs a designated operation.

The input device 150 may receive a command or data, which is used for a component (e.g., the processor 120) of the electronic device 101, from an outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 160 may visually provide information to the outside (e.g., the user) of the electronic device 101. For example, the display device 160 may include a display, a hologram device, or a projector and a control circuit for controlling a corresponding device. According to an embodiment, the display device 160 may include a touch circuitry configured to sense the touch or a sensor circuit (e.g., a pressure sensor) for measuring an intensity of pressure on the touch.

The audio module 170 may convert a sound and an electrical signal in dual directions. According to an embodiment, the audio module 170 may obtain the sound through the input device 150 or may output the sound through the sound output device 155 or an external electronic device (e.g., the electronic device 101a (e.g., a speaker or a headphone)) directly or wirelessly connected to the electronic device 101.

The sensor module 176 may generate an electrical signal or a data value corresponding to an operating state (e.g., power or temperature) inside or an environmental state (e.g., a user state) outside the electronic device 101. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols to allow the electronic device 101 to connect directly or wirelessly to the external electronic device (e.g., the electronic device 101a). According to an embodiment, the interface 177 may include, for example, an HDMI (high-definition multimedia interface), a USB (universal serial bus) interface, an SD card interface, or an audio interface.

A connecting terminal 178 may include a connector that physically connects the electronic device 101 to the external electronic device (e.g., the electronic device 101a). According to an embodiment, the connecting terminal 178 may include, for example, an HDMI connector, a USB connector, an SD card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. According to an embodiment, the haptic module 179 may include, for example, a motor, a piezoelectric element, or an electric stimulator.

The camera module 180 may shoot a still image or a video image. According to an embodiment, the camera module 180 may include, for example, at least one or more lenses, image sensors, image signal processors, or flashes.

The power management module 188 may manage power supplied to the electronic device 101. According to an embodiment, the power management module 188 may be implemented as at least a part of a power management integrated circuit (PMIC).

The battery 189 may supply power to at least one component of the electronic device 101. According to an embodiment, the battery 189 may include, for example, a non-rechargeable (primary) battery, a rechargeable (secondary) battery, or a fuel cell.

The communication module 190 may establish a direct (e.g., wired) or wireless communication channel between the electronic device 101 and the external electronic device (e.g., the electronic device 101a, the electronic device 101b, or the server 103) and support communication execution through the established communication channel. The communication module 190 may include at least one communication processor operating independently from the processor 120 (e.g., the application processor) and supporting the direct (e.g., wired) communication or the wireless communication. According to an embodiment, the communication module 190 may include a wireless communication module (or a wireless communication circuit) 192 (e.g., a cellular communication module, a short-range wireless communication module, or a GNSS (global navigation satellite system) communication module) or a wired communication module 194 (e.g., an LAN (local area network) communication module or a power line communication module). The corresponding communication module among the above communication modules may communicate with the external electronic device through the first network 198 (e.g., the short-range communication network such as a Bluetooth, a Wi-Fi direct, or an IrDA (infrared data association)) or the second network 199 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 192 may identify and authenticate the electronic device 101 using user information (e.g., international mobile subscriber identity (IMSI)) stored in the subscriber identification module 196 in the communication network, such as the first network 198 or the second network 199.

The antenna module 197 may transmit or receive a signal or power to or from the outside (e.g., an external electronic device). According to an embodiment, the antenna module may include one antenna including a radiator made of a conductor or conductive pattern formed on a substrate (e.g., a PCB). According to an embodiment, the antenna module 197 may include a plurality of antennas. In this case, for example, the communication module 190 may select one antenna suitable for a communication method used in the communication network such as the first network 198 or the second network 199 from the plurality of antennas. The signal or power may be transmitted or received between the communication module 190 and the external electronic device through the selected one antenna. According to some embodiments, in addition to the radiator, other parts (e.g., a RFIC) may be further formed as a portion of the antenna module 197.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 101 and the external electronic device 101b through the server 103 connected to the second network 199. Each of the electronic devices 101a and 101b may be the same or different types as or from the electronic device 101. According to an embodiment, all or some of the operations performed by the electronic device 101 may be performed by one or more external electronic devices among the external electronic devices 101a, 101b, or 103. For example, when the electronic device 101 performs some functions or services automatically or by request from a user or another device, the electronic device 101 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 101. The electronic device 101 may provide the result as is or after additional processing as at least a part of the response to the request. To this end, for example, a cloud computing, distributed computing, or client-server computing technology may be used.

Figure 2:
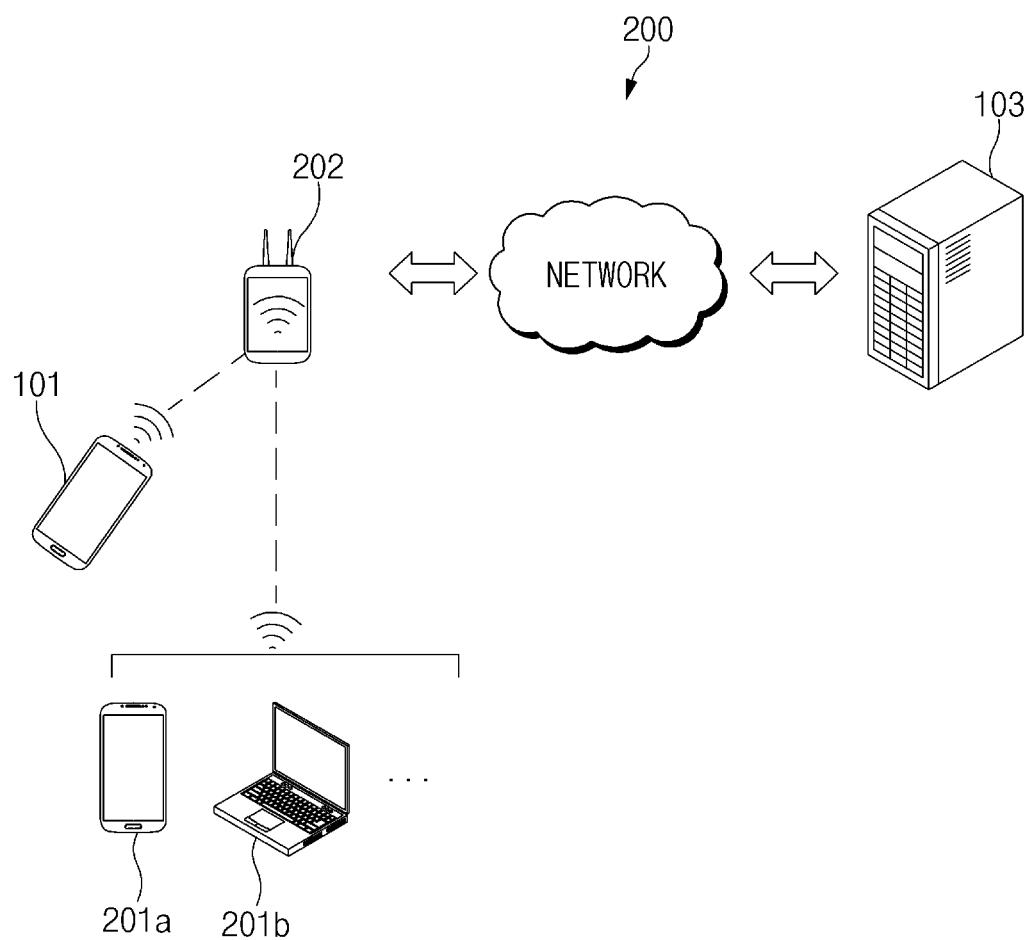
FIG. 2 illustrates a wireless communication system according to various embodiments.

FIG. 2 illustrates a wireless communication system according to various embodiments.

Referring to FIG. 2, a wireless communication system 200 may include the electronic device (or a terminal device) 101, an external electronic device 201a or 201b (e.g., the electronic device 101a or 101b in FIG. 1), a network device 202, and a server 103. According to an embodiment, the wireless communication system 200 may refer to a system that transmits data using WLAN (e.g., Wi-Fi).

The electronic device 101 and the external electronic device 201a or 201b may perform various functions by executing applications. For example, the electronic device 101 may launch a call app, a browser app, a video app, a music app, or a game app to perform a function of a voice call, web search, video playback, music playback, or real-time game execution.

The electronic device 101 and the external electronic device 201a or 201b may have the same or similar components. Hereinafter, operations performed on the electronic device 101 may be performed by each of the external electronic device 201a or 201b.

The electronic device 101 and the external electronic device 201a or 201b may be connected to a network through the network device 202 (e.g., access point (AP)), and may transmit and receive data associated with execution of the application. For example, the electronic device 101 may launch a real-time game app. The electronic device 101 may transmit data, which is generated while the real-time game app is running, to an external device (e.g., a game management server) through the network device 202.

According to various embodiments, the electronic device 101 may transmit data in an enhanced distributed channel access (EDCA) scheme as a QoS channel accessing method. In EDCA, the electronic device 101 may transmit traffic to the network device 202 by differentiating a priority to access a channel. For example, in EDCA, the electronic device 101 may set AC having four different levels and may transmit traffic depending on AC.

In EDCA, traffic with a high priority may have more chances to be transmitted than traffic with a low priority. In Table 1, a size of a contention window (hereinafter, referred to as "CW") may be determined for each AC value. The traffic with a high priority may have a relatively short CW and arbitration inter-frame space (AIFS).

TABLE 1

| AC | CWmin | CWmax | AIFSN | Maximum TXOP |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

In EDCA, the electronic device 101 may process traffic delivered by an application by dividing the traffic into AC_VO (voice), AC_VI (video), AC_BE (best effort), and AC_BK (background). A priority for resource use of a wireless communication circuit may be high in the order of AC_VO, AC_VI, AC_BE, and AC_BK. As the priority is higher, a channel may be fast accessed by using a lower CW value. As the priority is higher, the channel occupancy may be easy through shorter AIFS.

In addition, as the priority is higher, more packets may be transmitted within a predetermined transmit opportunity (TXOP) by supporting longer TXOP. In the order of AC_VO, AC_VI, AC_BE, and AC_BK, fast channel occupancy and packet transmission may be advantageous, and lower latency may be guaranteed.

According to various embodiments, the electronic device 101 may change a priority to access a channel depending on an operating feature (alternatively, an operating attribute or an operating mode) of an application. For example, when the real-time game app operates in the foreground, the electronic device 101 may change the priority from AC_BE to AC_VO or AC_VI.

According to an embodiment, when an application having a specified feature or an application operating in a specific mode is executed, the electronic device 101 may change the priority to access a channel. The electronic device 101 may change the priority based on a predetermined rule or may change the priority based on a rule changed depending on a network condition.

According to various embodiments, when continuous collisions or channel usages are detected in Wi-Fi channel N times or more, the electronic device 101 may adjust a priority to access a channel to a lower level (AC_VO→AC_VI→AC_BE→AC_BK). For example, terminals set to AC_VO may set the maximum CW (CW_MAX) to 15. As the number of terminals set to AC_VO increases, a probability that a collision between signals occurs may increase. Moreover, when 16 or more terminals set to AC_VO are connected to one router and perform communication, the number of terminals exceeds CW_MAX, and thus the collision between signals necessarily occurs. Accordingly, communication may be impossible. The electronic device 101 may adjust its AC to AC_VI having more CW_MAX.

According to various embodiments, when channel congestion is not detected M times or more, the electronic device 101 may adjust the priority to access a channel to a higher level (AC_BK→AC_BE→AC_VI→AC_VO). For example, when the terminal set to AC_VI succeeds in receiving packet ACK M times or more, the electronic device 101 may increase the priority to AC_VO.

The network device 202 may refer to a device that links a network of an external device (e.g., the server 103) to a peripheral device through wireless communication in a specified space. For example, the wireless communication may support Wi-Fi. The network device 202 may be an AP or a router.

The server 103 may perform a calculation corresponding to a request signal of the electronic device 101, the external electronic device 201a or 201b, or the network device 202. The server 103 may transmit the calculation result to the electronic device 101, the external electronic device 201a or 201b, or the network device 202. In an embodiment, the server 103 may refer to a service server associated with execution of an application running in the electronic device 101 or the external electronic device 201a or 201b. For example, the server 103 may refer to a service server for a real-time game app. In another embodiment, the server 103 may be a terminal management server operated by a manufacturer of the electronic device 101 or the external electronic device 201a or 201b or a software management company.

Figure 3:
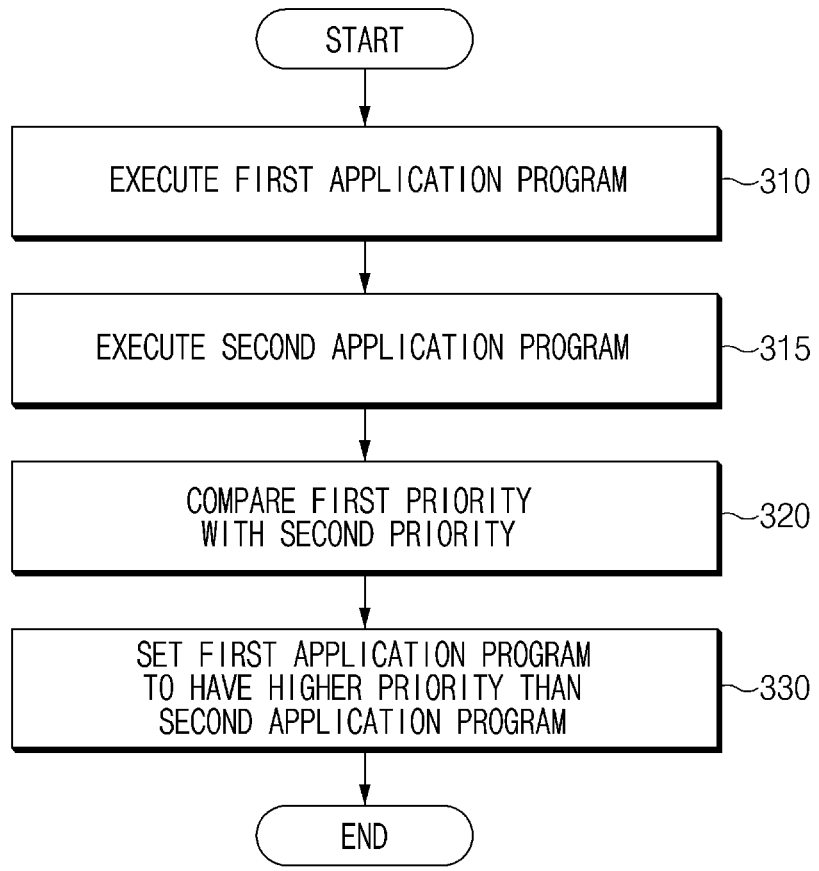
FIG. 3 illustrates a wireless communication method of dynamically changing a priority to access a channel according to various embodiments.

FIG. 3 illustrates a wireless communication method of dynamically changing a priority to access a channel according to various embodiments.

Referring to FIG. 3, in operation 310, the processor 120 of the electronic device 101 may execute a first application program. A priority to access a channel for wireless communication may be assigned to the first application program in advance. According to an embodiment, the first application program may be set to a first priority.

In operation 315, the processor 120 may execute a second application program. A priority to access a channel for wireless communication may be assigned to the second application program in advance. According to an embodiment, the second application program may be set to a second priority.

For example, the first application program (e.g., a real-time game app) may have a priority of AC_BK (background) in EDCA. The second application program (e.g., a call app) may have a priority of AC_VO (voice) in EDCA. Hereinafter, it is mainly described that the first application program is a real-time game app in the processor 120, but is not limited thereto.

In operation 320, when the first application program is displayed on a display (e.g., the display device 160 of FIG. 1) and the second application program is not displayed on the display, the processor 120 may compare the first priority of the first application program with the second priority of the second application program. For example, when the first application program is displayed on the display, the first application program may be in a foreground operating state, and the second application program may be in a background operating state. In the previous example, the processor 120 may compare the first priority (e.g., AC_BK (background)) of the first application program (e.g., a real-time game app) with the second priority (e.g., AC_VO (voice)) of the second application program (e.g., a call app).

According to an embodiment, when the first application program and the second application program are displayed on a display (e.g., the display device 160 of FIG. 1) (e.g., multi-window) together, the processor 120 may allow the first application program to have the same priority as the second application program.

In operation 330, the processor 120 may allow the first application program to have a higher priority than the second application program based at least partly on the comparison. For example, the processor 120 may change the first priority of the first application program (e.g., a real-time game app) from AC_BK (background) to AC_VO (voice). Accordingly, the transmission speed of a data packet, which is transmitted from the electronic device 101 to the network device 202 and is generated by the first application program (e.g., a real-time game app), may become faster than the transmission speed of a data packet before the priority is changed.

For another example, the processor 120 may change the first priority of the first application program (e.g., a real-time game app) from AC_BK (background) to AC_VO (voice), and may change the second priority of the second application program (e.g., a call app) from AC_VO (voice) to AC_BK (background). Accordingly, the transmission speed of the data packet generated by the first application program (e.g., a real-time game app) may be relatively fast, and the transmission speed of the data packet generated by the second application program (e.g., a call app) may be relatively slow.

According to various embodiments, the processor 120 may change a priority to access a channel for wireless communication through an application integrated management module (or an integrated management application) (e.g., a game launcher).

Figure 4:
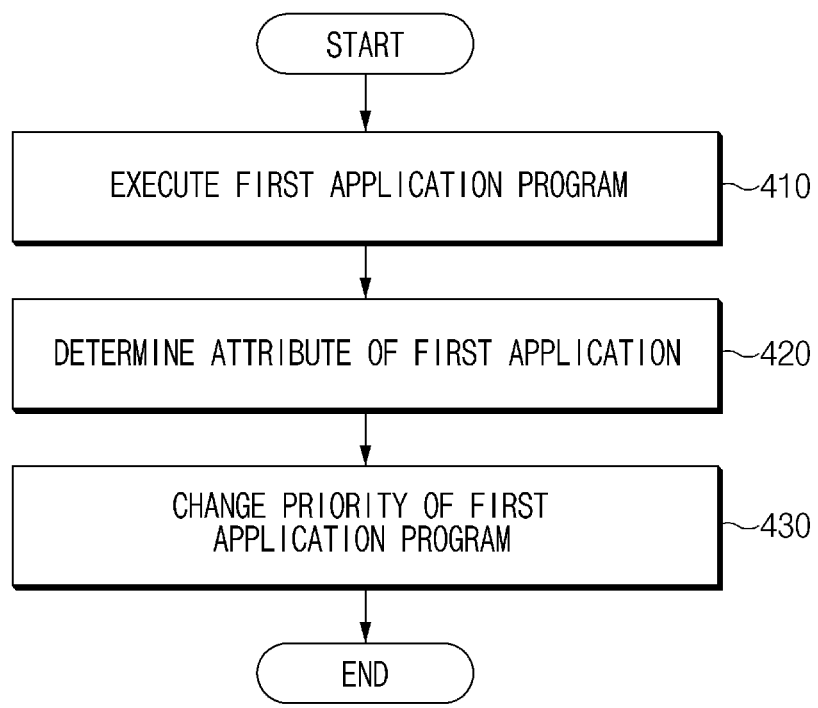
FIG. 4 illustrates a wireless communication method for dynamically changing a priority to access a channel according to an attribute of an application according to various embodiments.

FIG. 4 illustrates a wireless communication method for dynamically changing a priority to access a channel according to an attribute of an application according to various embodiments.

Referring to FIG. 4, in operation 410, the processor 120 of the electronic device 101 may execute a first application program. A priority to access a channel for wireless communication may be assigned to the first application program in advance. According to an embodiment, the first application program may be set to a first priority. For example, the first application program (e.g., a real-time game app) may have a priority of AC_BK (background) in EDCA.

In operation 420, when the first application program is displayed on a display (e.g., the display device 160 of FIG. 1), the processor 120 may determine an attribute of the first application program. The processor 120 may determine whether the first application program has a low latency attribute, with reference to an application list stored in the internal memory 130 or an application list received from an external device.

In operation 430, the processor 120 may increase the priority of the first application program to be higher than the specified first priority based at least partly on the determination result. For example, the processor 120 may change the priority of the first application program (e.g., a real-time game app) from AC_BK (background) to AC_VO (voice). Accordingly, the transmission speed of a data packet generated by the first application program (e.g., a real-time game app) may be relatively fast.

Figure 5:
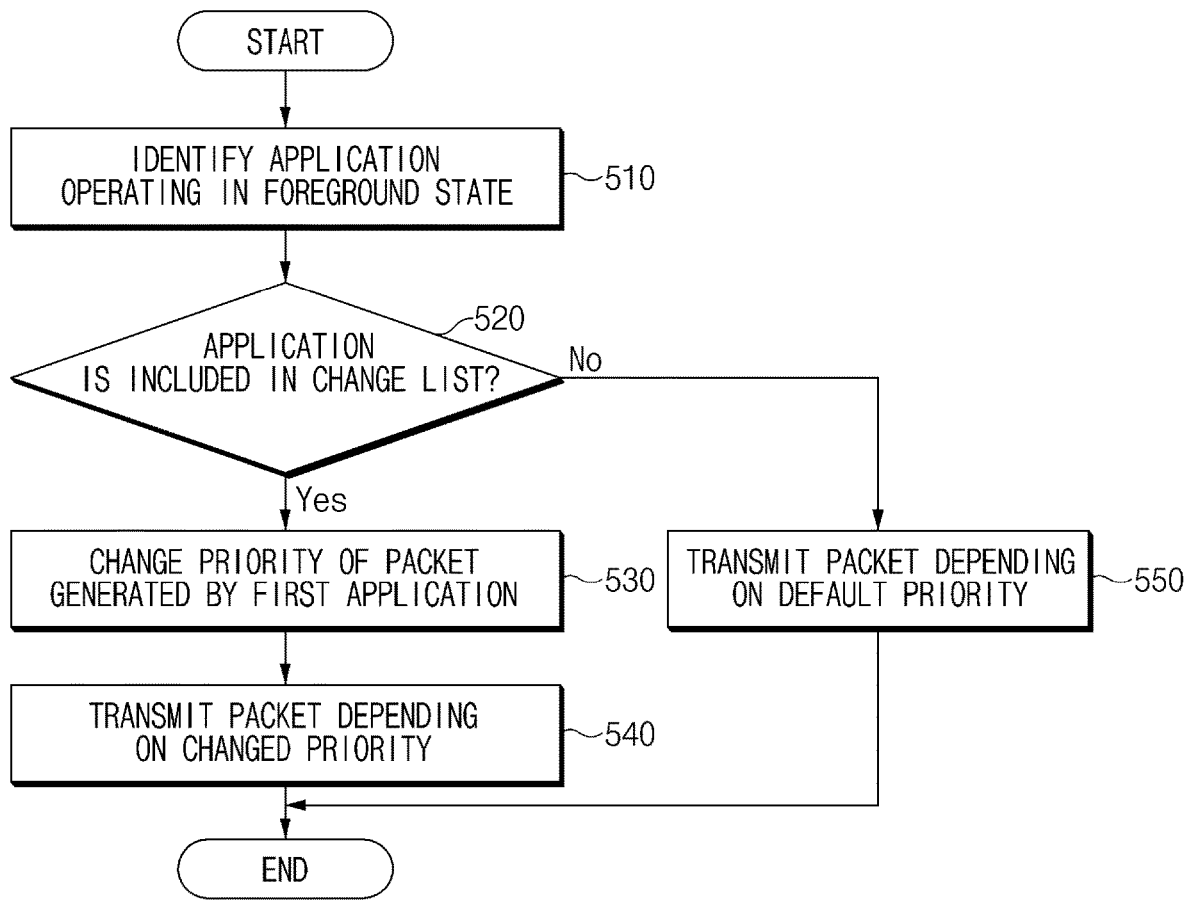
FIG. 5 illustrates a wireless communication method using a list, which is a change target of a priority, according to various embodiments.

FIG. 5 illustrates a wireless communication method using a list, which is a change target of a priority, according to various embodiments.

Referring to FIG. 5, in operation 510, the processor 120 may identify an application (or an application program) operating in the foreground state. In a region where a display (e.g., the display device 160 of FIG. 1) is occupied by the first application, memory occupancy, or occupancy of the processor 120, the foreground state may be a running state with a priority as compared to another application.

For example, when a user touches an icon of the first application, the first application (e.g., a real-time game app) may be executed on the full screen of the display in response to a user input. For another example, while the first application is operating in the foreground, the first application may be changed to the background state, and the second application may be executed in the foreground, in response to a user input or execution of a second application. Afterward, when a separate user input occurs or the second application is terminated, the first application may be executed in the foreground.

For still another example, when the display is executed in a multi-window scheme and both the first application and the second application are running at the same time, both the first application and the second application may operate in the foreground.

Hereinafter, it is described that the first application is a real-time game app operating in the foreground, but is not limited thereto.

In operation 520, the processor 120 may determine whether the first application operating in the foreground is included in a list (hereinafter, referred to as a "change list"), which is a change target of a priority for resource use of a wireless communication circuit. For example, the change list may be a list of applications specified to increase or decrease a priority upon transmitting data traffic using resources of a wireless communication circuit. According to an embodiment, the change list may include an application with a low latency attribute with regard to the use of resources of the wireless communication circuit.

In an embodiment, the electronic device 101 may display a user interface for setting an application to be included in the change list. The application (e.g., a real-time game app) selected in response to a user input may be included in the change list.

In an embodiment, the change list may include an application specified by a manufacturer or a service company. The electronic device 101 may make a request for the identifying of the change list to the server 103 or may receive and store the change list from the server 103.

According to an embodiment, the change list may be stored in the memory 130 inside the electronic device 101. When the first application is running in the foreground, the processor 120 may match first identification information (e.g., an application name, a package file name of an application, and/or version information of an application) of the first application in the change list stored in the memory 130. The processor 120 may change a QoS policy of the first application that is matched. Under a specified condition, the processor 120 may change the priority of a packet generated by the first application and may transmit the packet to an external device.

According to an embodiment, the processor 120 may make a request for the update of the change list to the network device 202 or the server 103 under a specified condition. For example, the specified condition may be at least one event: an event that the first application does not match in the change list stored in the memory 130, an event that the specified time period has elapsed, or an event that data traffic according to execution of an application occurs. The processor 120 may receive the updated change list and may determine whether the first application is matched.

According to another embodiment, the change list may be stored in the internal memory of the network device 202 or the server 103. The processor 120 may transmit a request signal including the first identification information of the first application operating in the foreground, through the communication interface 260. When the network device 202 or the server 103 receives the request signal, the network device 202 or the server 103 may match the first identification information (e.g., an application name, a package file name of an application, and/or version information of an application) in the change list stored in the internal memory of the network device 202 or the server 103. The network device 202 or the server 103 may transmit the matching result to the electronic device 101. The processor 120 may change a QoS policy of the first application based on the received matching result. Under a specified condition, the processor 120 may change the priority of a packet generated by the first application and may transmit the packet to an external device (e.g., the network device 202 or the server 103).

In operation 530, when the first application is included in the change list, the processor 120 may increase the priority of traffic generated by the first application. The application program 146 may transmit second identification information (or packet identification information) (e.g., user identification (UID)) of the first application to the kernel 142. The second identification information may be an identification mark indicating that data traffic is generated by the first application. The kernel 142 may store the received second identification information in a buffer. When receiving a packet having the second identification information, the kernel 142 may increase the priority of channel access to the corresponding packet.

In operation 540, the processor 120 may transmit a packet to the external device (e.g., the network device 202 or the server 103) depending on the changed priority.

For example, the kernel 142 may receive a UID of a real-time game app from the application program 146. The kernel 142 may store the UID of the real-time game app in a buffer. Afterward, the kernel 142 may identify the UID of the packet received from the application program 146. When the UID of the received packet is identical to the stored UID, the kernel 142 may change an AC setting value of the corresponding packet into a value having a higher priority (e.g., changing AC_BE to AC_VO) and may transmit the corresponding packet to the network device 202.

According to various embodiments, when a process of identifying UID values of all packets is complicated or causes time delay, the processor 120 may store a destination IP address based on the packet, of which the same UID is identified, and may adjust AC values of packets having the same destination IP address.

According to various embodiments, when the first application (e.g., a real-time game app) is running in the foreground, the processor 120 may adjust AC values of all user datagram protocol (UDP) packets transmitted from the application program 146 to the kernel 142. The processor 120 may perform QoS management only on the UDP packets by reflecting the fact that transmission control protocol (TCP) packets are highly likely to be used to upload or download large amounts of data and UDP packets are highly likely to be used to upload or download real-time data of low-capacity.

According to various embodiments, the processor 120 may maintain the number of applications having the changed priority for channel access to the specified number or less. For example, the processor 120 may allow a change in AC value with respect to two or less applications.

According to various embodiments, the processor 120 may detect a change in the operating state of the first application in the foreground state. When the execution of the first application is interrupted or the state of the first application is switched to the background state, the processor 120 may change the changed AC value to an existing setting value. For example, while the real-time game app is running with a high priority, when a call occurs and a user input to receive a call occurs, the processor 120 may change the AC value of a real-time game app from AC_VO (voice) to AC_BK (background) that is a default setting value.

According to various embodiments, when the first application is operating in the foreground, the processor 120 may provide a notification that a communication priority for channel access is capable of being changed, through a pop-up message or a toast message. In response to a user input, the processor 120 may display a user interface for manually changing the priority or may change the priority automatically.

In operation 550, when the first application is not included in the change list, the processor 120 may transmit a packet depending on a default priority of traffic generated by the first application.

Figure 6:
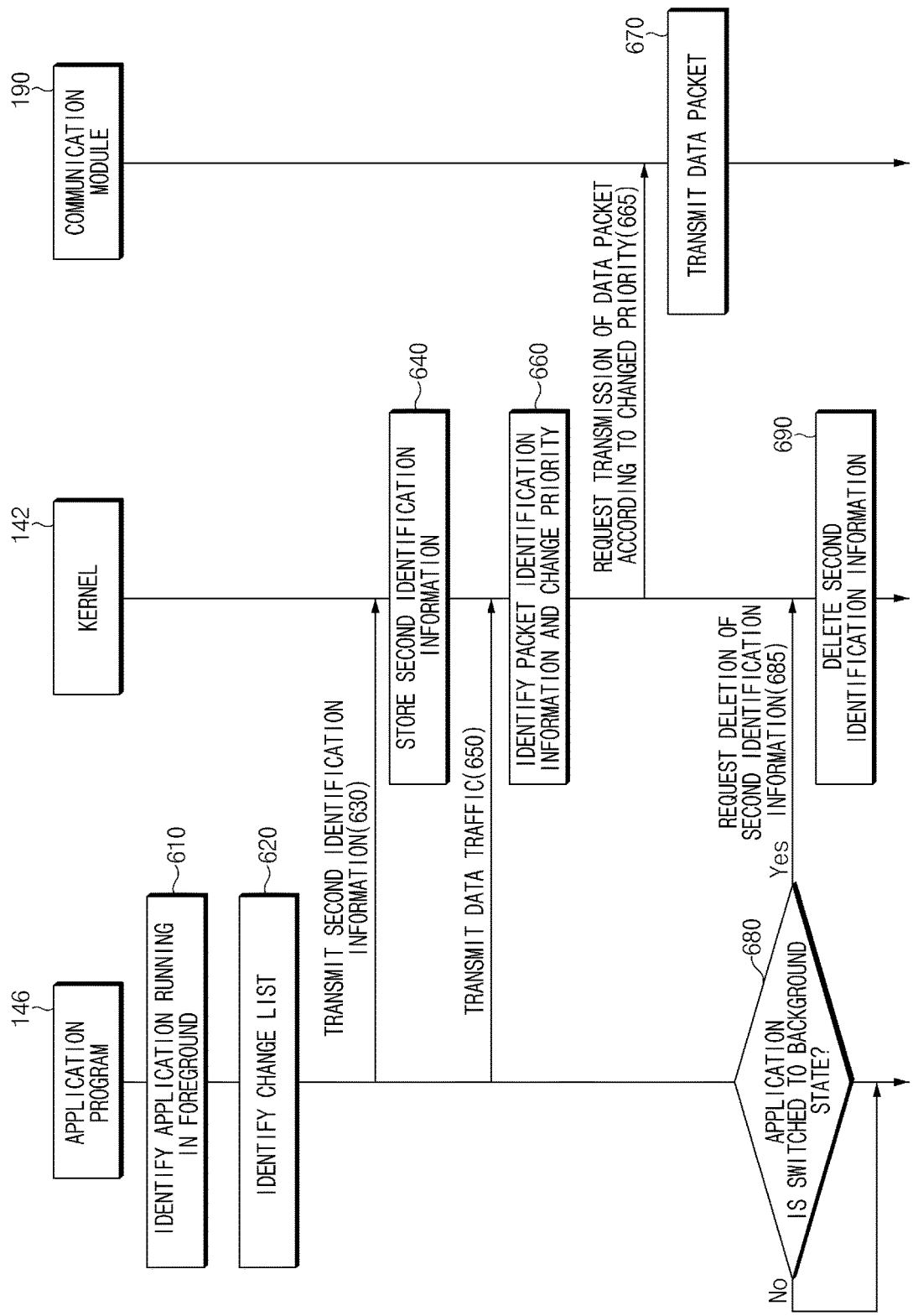
FIG. 6 is a flowchart of a signal between an application program and a kernel according to various embodiments.

FIG. 6 is a flowchart of a signal between an application program and a kernel according to various embodiments.

Referring to FIG. 6, in operation 610, the application program 146 may identify an application running in a foreground state. For example, in a region where a display (e.g., the display device 160 of FIG. 1) is occupied, memory occupancy, or occupancy of the processor 120 as compared to another application, the application program 146 may identify the first identification information (e.g., an application name, a package file name of an application, and/or version information of an application) of a first application (e.g., a real-time game app), which is running with a priority, by a user input or a call of another application.

In operation 620, the application program 146 may determine whether the first identification information of the first application operating in the foreground is included in a change list of a priority for resource use of a wireless communication circuit. For example, an application having a relatively low transmission priority of data traffic, such as a real-time game app, may be included in the change list.

According to an embodiment, the application program 146 may determine whether the first application operating in the foreground is included in the change list, based on the change list stored in the memory 130 inside the electronic device 101 or the change list received from an external device (e.g., the network device 202 or the server 103).

In operation 630, the application program 146 may transmit second identification information (or packet identification information) (e.g., UID) of the first application to the kernel 142 when the first identification information of the first application is included in the change list. The second identification information may be identification information indicating that data traffic is generated by the first application. For example, the second identification information may be the UID of the first application. According to an embodiment, the application program 146 may transmit, to the kernel 142, a priority value (e.g., AC_BK→AC_VO) to be changed.

According to an embodiment, a management module present in the application program 146 or the middleware 144 may transmit, to the kernel 142, the second identification information (e.g., UID) of the first application and the priority value to be changed.

In operation 640, the kernel 142 may store the received second identification information in a buffer. The stored second identification information may be referenced in a procedure of processing data traffic that occurs later.

In operation 650, the application program 146 may transmit data traffic to the kernel 142. The data traffic may be data packets generated depending on operations of various applications running in the application program 146.

In operation 660, the kernel 142 may identify packet identification information of received data traffic. When the received packet identification information is identical to the stored second identification information, the kernel 142 may increase the transmission priority of the corresponding packet. For example, the processor 120 may change the transmission priority of the corresponding packet from AC_BK (background) to AC_VO (voice).

In operation 665, the kernel 142 may request the communication module 190 to transmit a data packet of which the priority is changed. In operation 670, the communication module 190 may transmit a data packet to the network device 202 (e.g., AP) depending on the changed priority.

According to various embodiments, in operation 680, the application program 146 may determine whether the first application operating in the foreground is switched to the background state. For example, while a real-time game app is executed, the application program 146 may determine whether a call occurs and a user input to receive a call occurs. For another example, while the real-time game app is executed, the application program 146 may determine whether a message is received and a user input to receive a message occurs.

In operation 685, the application program 146 may transmit a signal for requesting deletion of the second identification information stored in the kernel 142 when the first application is switched to the background state.

In operation 690, the kernel 142 may delete the second identification information stored in response to the signal. Afterward, when there is no separate request, data traffic generated by the first application may be processed by a default setting value having a relatively low transmission priority.

According to various embodiments, when the first application is switched back to the foreground state, the application program 146 may again transmit the UID of the first application to the kernel 142. The kernel 142 may store the UID and may change the priority of data packets generated by the first application.

Figure 7:
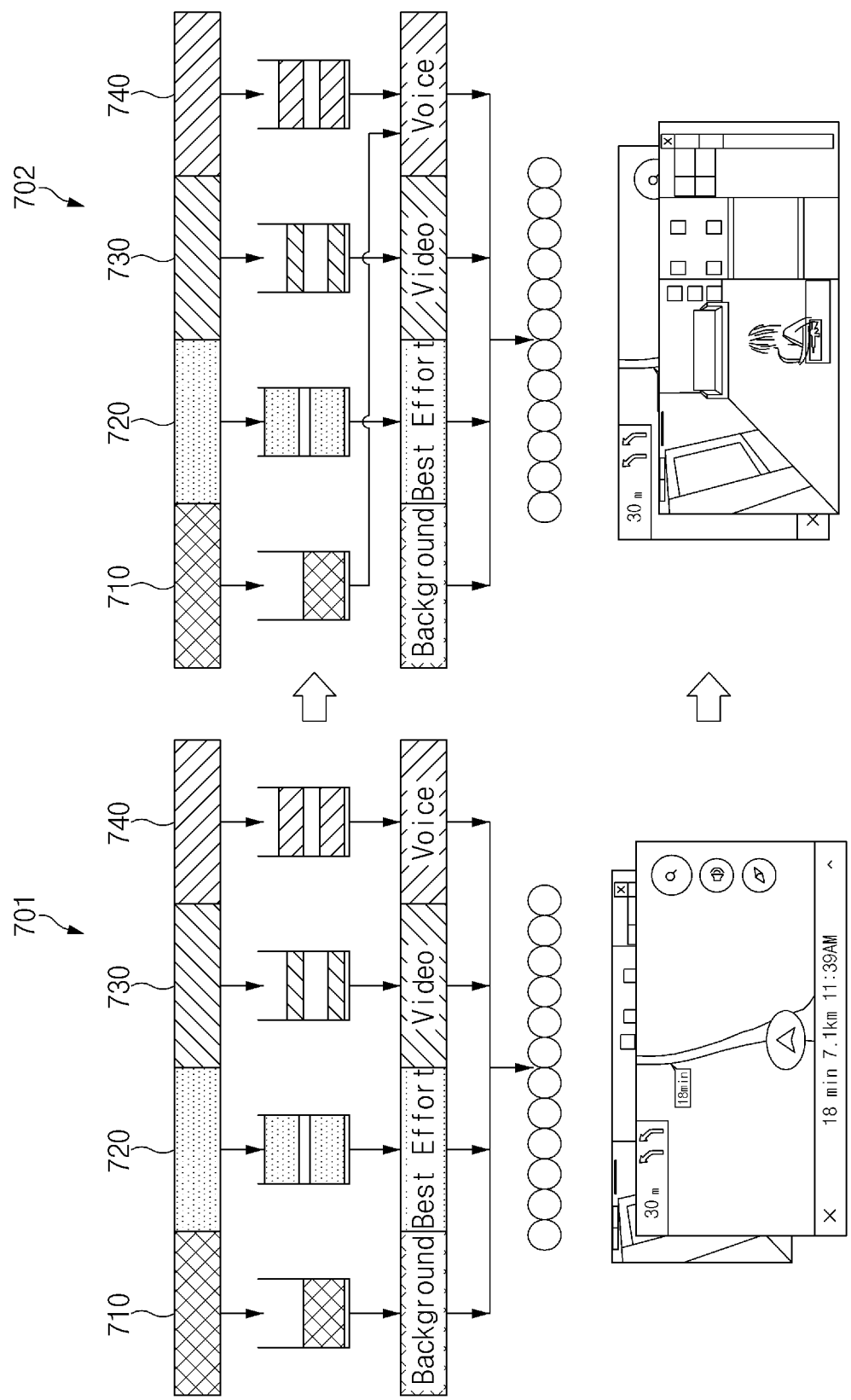
FIG. 7 is an exemplary diagram illustrating a change in QoS priority according to various embodiments.

FIG. 7 is an exemplary diagram illustrating a change in QoS priority according to various embodiments.

Referring to FIG. 7, in a first state 701, the application program 213 may execute first to fourth applications. A first application 710 may be set to a fourth priority (AC_BE) in a state before a foreground operation. A packet generated by the first application 710 may have a transmission speed lower than a packet generated by each of second to fourth applications 720 to 740.

For example, the first application 710 may be a real-time game app, and the second to fourth applications may be a music playing app, a video playing app, and a call app, respectively. When a real-time game app is operating in a background, a packet generated by the real-time game app may have a transmission priority lower than a packet generated by the music playing app, the video playing app, or the call app.

When the first application 710 is included in a change list of priority for resource use of a wireless communication circuit, the transmission priority of a packet generated by the first application 710 may be changed depending on an operating state of the first application 710.

In a second state 702, the first application 710 may be changed from a background state to a foreground state. For example, the first application (e.g., a game app) may be executed on the full screen of a display (e.g., the display device 160 of FIG. 1). The priority of a packet generated by the first application 710 may be changed (e.g., changing from AC_BK (background) to AC_VO (voice)). Accordingly, the transmission speed of a data packet generated by the first application program 710 may be relatively fast. For example, when the first application program 710 is a real-time game app, a user may utilize a game in a seamless communication environment.

Figure 8:
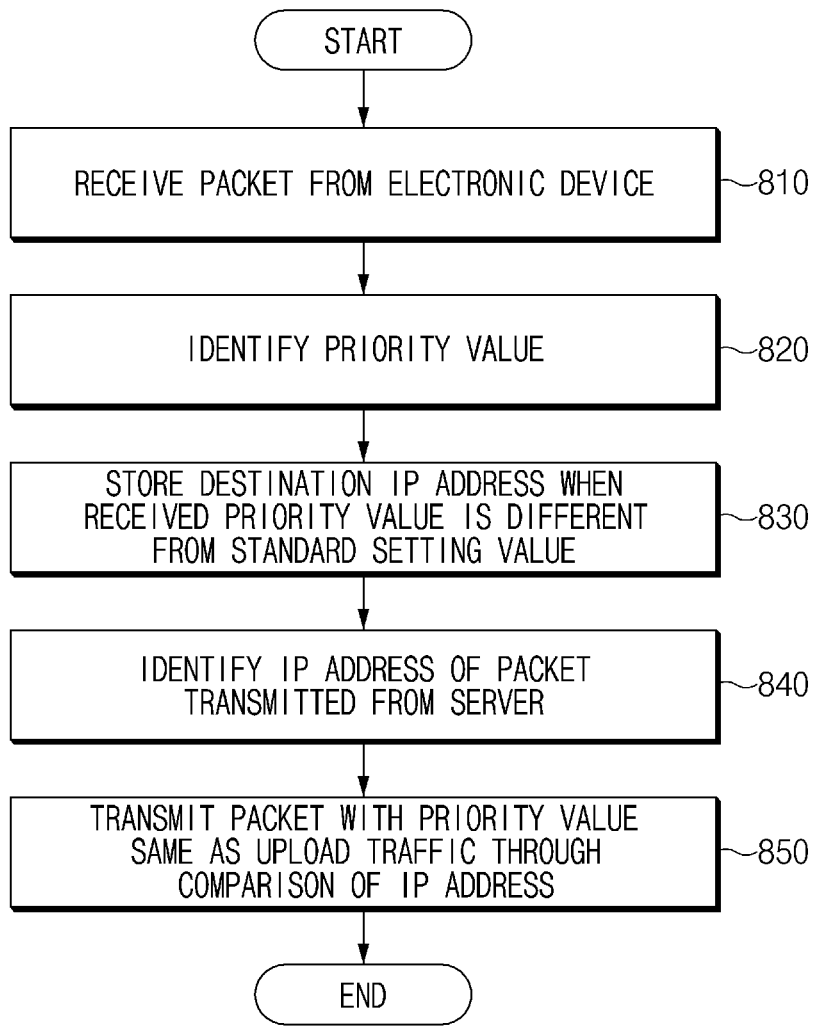
FIG. 8 is an operation of a network device according to various embodiments.

FIG. 8 is an operation of a network device according to various embodiments.

Referring to FIG. 8, in operation 810, the network device 202 (e.g., an AP or a router) may receive packets from the electronic device 101 and/or the external electronic device 201a or 201b.

In operation 820, the network device 202 may identify priority values (e.g., an AC value and a differentiated services code point (DSCP) value) of received packets.

In operation 830, the network device 202 may store a destination IP address of a corresponding packet when the received priority value is different from the standard setting value associated with a WLAN network packet priority.

In operation 840, the network device 202 may identify an IP address of a packet transmitted to the network device 202 to transmit the packet from the server 103 (e.g., real-time game server) to the electronic device 101 and/or the external electronic device 201a or 201b.

In operation 850, the network device 202 may transmit a packet received from the server 103 to the electronic device 101 and/or the external electronic device 201a or 201b with a priority value the same as upload traffic for Wi-Fi packets received from the electronic device 101 and/or the external electronic device 201a or 201b when the stored destination IP address is identical to an IP address of the received packet. In this way, with regard to of an application in which the priority of uplink traffic is changed in the electronic device 101 and/or the external electronic device 201a or 201b, the transmission speed of the downlink traffic may increase.

According to various embodiments, the network device 202 may collectively change the transmission priority of traffic associated with the managed electronic device 101 and/or the external electronic device 201a or 201b. The network device 202 may receive device state information about an application operating in a foreground in either the electronic device 101 or the external electronic device 201a or 201b. The network device 202 may store a change list for a priority of channel access. The change list may be received and stored from the electronic device 101, 201a, or 201b or the server 103. The network device 202 may collectively change the transmission priority of traffic generated by the application operating in the foreground state in the electronic device 101, 201a, or 201b, based on the change list and the device state information.

Figure 9:
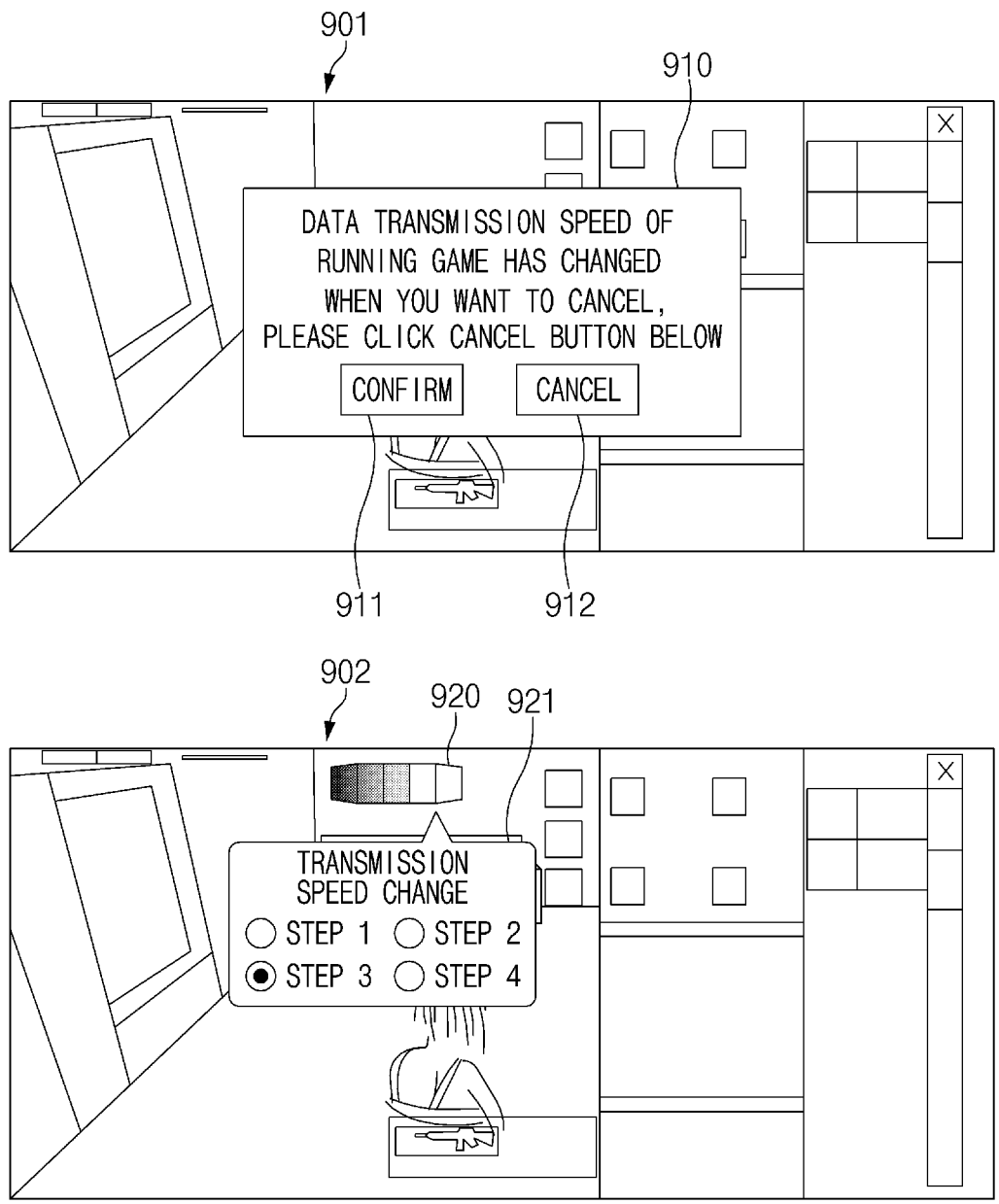
FIG. 9 is an exemplary diagram of a user interface associated with a priority change according to various embodiments.

FIG. 9 is an exemplary diagram of a user interface associated with a priority change according to various embodiments. FIG. 9 is, but is not limited to, an example.

Referring to FIG. 9, on screen 901, the processor 120 may change a priority to access a channel for wireless communication when an application (e.g., a real-time game app) operates in a foreground. When the priority is changed, the processor 120 may indicate that the transmission speed of traffic associated with an application operating in the foreground has changed, through a pop-up window 910 on a display (e.g., the display device 160 of FIG. 1).

According to an embodiment, when a user selects a confirm button 911, the processor 120 may maintain the changed priority. When the user selects a cancel button 912, the processor 120 may return the changed priority to a previous value.

On screen 902, the processor 120 may display a state display 920 for a priority to access a channel for wireless communication when an application (e.g., a real-time game app) is operating in a foreground. For example, when the priority is changed, the processor 120 may change a shape (e.g., a bar that changes depending on a priority) or color (e.g., when a priority increases—green/when a priority decreases—red) of the state display 920.

According to an embodiment, when a separate user input occurs on the state display 920, the processor 120 may display a user interface 921 for changing the priority. The processor 120 may change a priority of an application operating in the foreground based on an option selected through a user input among options displayed on the user interface 921. According to an embodiment, when an application (e.g., a real-time game app) is operating in the foreground, the processor 120 may display an icon (not illustrated) for providing a notification that a priority to access a channel for wireless communication has been changed, on a user interface.

According to an embodiment disclosed in the specification, an electronic device (e.g., the electronic device 101 of FIG. 1 or 2) may include a display (e.g., the display device 160 of FIG. 1), a wireless communication circuit (e.g., the communication module 190 of FIG. 1), a processor (e.g., the processor 120 of FIG. 1) operatively connected to the display and the wireless communication circuit, and a memory (e.g., the memory 130 of FIG. 1) operatively connected to the processor and storing a first application program having a first priority associated with use of a resource of the wireless communication circuit and a second application program having a second priority associated with the use of the resource. The memory may store instructions that cause the processor to execute the first application program, to execute the second application program, to compare the first priority with the second priority when the first application program is displayed on the display, and to cause the first application program to have a priority the same as the second application program or to have a priority higher than the second application program, based at least partly on the comparison. The instructions may cause the processor to determine whether the first application program has a low latency attribute and to adjust a priority of the first application program based at least partly on the determined attribute.

According to various embodiments, the first priority and the second priority may have the same priority as each other.

According to various embodiments, the instructions may cause the processor to assign a priority higher than the first priority to the first application program based at least partly on the comparison.

According to various embodiments, the instructions may cause the processor to assign a priority lower than the second priority to the second application program based at least partly on the comparison.

According to various embodiments, the memory may be configured to store four priorities associated with use of the resource.

According to various embodiments, the instructions may cause the processor to store first packet identification information about the first application program and second packet identification information about the second application program and to change a priority of the first application program and a priority of the second application program with reference to the first packet identification information and the second packet identification information.

According to various embodiments, the instructions may cause the processor to change a priority of a user datagram protocol (UDP) packet generated by the first application program and the second application program.

According to various embodiments, the instructions may cause the processor to identify the number of packet transmission failures occurring in the first application program, and to change a priority of the first application program to the first priority when the number of transmission failures is not less than a specified value.

According to various embodiments, the instructions may cause the processor to store a destination IP address of a packet generated by the first application program and the second application program and to transmit the packet generated by the first application program and the second application program depending on the changed priority with reference to the stored IP address.

According to various embodiments, the instructions may cause the processor to change a priority of the first application program and a priority of the second application program based on execution state information of the electronic device. The execution state information may include at least one of information about an application running in the electronic device, storage information of the memory, or calculation processing information of the processor.

According to various embodiments, the instructions may cause the processor to cause the second application program to have a priority higher than the first application program on the display when the second application program is displayed on the display and the first application program is not displayed on the display.

According to various embodiments, an electronic device (e.g., the electronic device 101 of FIG. 1 or 2) may include a display (e.g., the display device 160 of FIG. 1), a wireless communication circuit (e.g., the communication module 190 of FIG. 1), a processor (e.g., the processor 120 of FIG. 1) operatively connected to the display and the wireless communication circuit, and a memory (e.g., the memory 130 of FIG. 1) operatively connected to the processor and configured to store a first application program having a first priority associated with use of a resource of a wireless communication circuit. The memory may store instructions that cause the processor to execute the first application program, to determine an attribute of the first application program when the first application program is displayed on the display, and to increase a priority of the first application program to be higher than the first priority based at least partly on the determination result.

According to various embodiments, the instructions may cause the processor to determine whether identification information of the first application program is included in an application list stored in the memory.

According to various embodiments, the instructions may cause the processor to transmit identification information of the first application program to an external device through the wireless communication circuit and to receive a signal for determining whether the first application program has a low latency attribute, through the wireless communication circuit. The signal may include information about a value of which the first priority is to be changed.

According to various embodiments, the instructions may cause the processor to determine the attribute when a screen associated with the first application program occupies the display by a specified range or more.

According to various embodiments, a network device may include a plurality of terminal devices, a wireless communication circuit, and a processor operatively connected to the wireless communication circuit, and a memory operatively connected to the processor. The memory may store instructions that cause the processor to receive information about an execution state and identification information of an application program running in each of the plurality of terminal devices, to determine whether the identification information is included in an application list stored in the memory, and to change a priority to transmit a packet associated with the application program to an external device based on information about the execution state when the identification information is included in the application list. The instructions that cause the processor to store a destination IP address of the packet, to receive a downlink packet transmitted to at least one terminal device among the plurality of terminal devices, and to transmit the downlink packet to the at least one terminal device depending on the changed priority when the downlink packet is generated from an external device having the same IP address as the destination IP address.

According to various embodiments, a wireless communication method may include storing a first application program having a first priority associated with use of a resource of a wireless communication circuit (e.g., the communication module 190 of FIG. 1) and a second application program having a second priority associated with the use of the resource, executing the first application program and the second application program, comparing the first priority with the second priority when the first application program is displayed on a display (e.g., the display device 160 of FIG. 1) of the electronic device, and changing a priority of the first application program based at least partly on the comparison such that the first application program has a priority the same as the second application program or has a priority higher than the second application program. The first application program and the second application program are performed by an electronic device (e.g., the electronic device 101 of FIG. 1 or 2).

According to various embodiments, the changing of the priority of the first application program such that the first application program has a priority higher than the second application program may include determining whether the first application program has a low latency attribute and adjusting the priority of the first application program based at least partly on the determined attribute.

According to various embodiments, the changing of the priority of the first application program such that the first application program has a priority higher than the second application program may include assigning a priority higher than the first priority to the first application program based at least partly on the comparison.

According to various embodiments, the changing of the priority of the first application program such that the first application program has a priority higher than the second application program may include assign a priority lower than the second priority to the second application program based at least partly on the comparison.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. An electronic device according to an embodiment of this specification may not be limited to the above-described electronic devices.

It should be understood that various embodiments of the disclosure and terms used in the embodiments do not intend to limit technical features disclosed in the disclosure to the particular embodiment disclosed herein; rather, the disclosure should be construed to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" used in the disclosure may include a unit implemented in hardware, software, or firmware and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 140) including an instruction stored in a machine-readable storage medium (e.g., an internal memory 136 or an external memory 138) readable by a machine (e.g., the electronic device 101). For example, the processor (e.g., the processor 120) of a machine (e.g., the electronic device 101) may call the instruction from the machine-readable storage medium and execute the instructions thus called. This means that the machine may perform at least one function based on the called at least one instruction. The one or more instructions may include a code generated by a compiler or executable by an interpreter. The machine-readable storage medium may be provided in the form of non-transitory storage medium. Here, the term "non-transitory", as used herein, means that the storage medium is tangible, but does not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

The invention claimed is:

1. An electronic device comprising:
   a display;
   a wireless communication circuit;
   a processor operatively connected to the display and the wireless communication circuit; and
   a memory operatively connected to the processor and configured to store a first application program having a first priority associated with use of a resource of the wireless communication circuit and a second application program having a second priority associated with the use of the resource,
   wherein the memory stores a list of applications with low latency attributes, and
   wherein the memory further stores instructions that cause the processor to:
      execute the first application program,
      execute the second application program,
      when the first application program is displayed on the display, determine whether the first application program has a low latency attribute using the list,
      when the first application program is determined as having the low latency attribute, compare the first priority with the second priority, and
      cause the first application program to have a priority the same as the second application program or to have a priority higher than the second application program, based on the comparison.

2. The electronic device of claim 1, wherein the first priority and the second priority have a same priority as each other.

3. The electronic device of claim 1, wherein the instructions further cause the processor to:
   assign a priority higher than the first priority to the first application program based at least partly on the comparison.

4. The electronic device of claim 1, wherein the instructions further cause the processor to:
   assign a priority lower than the second priority to the second application program based at least partly on the comparison.

5. The electronic device of claim 1, wherein the instructions further cause the processor to:
   store first packet identification information about the first application program and second packet identification information about the second application program, and
   change a priority of the first application program and a priority of the second application program with reference to the first packet identification information and the second packet identification information.

6. The electronic device of claim 1, wherein the instructions further cause the processor to:
   change a priority of a user datagram protocol (UDP) packet generated by the first application program and the second application program.

7. The electronic device of claim 1, wherein the instructions further cause the processor to:
   change a priority of the first application program and a priority of the second application program based on execution state information of the electronic device.

8. The electronic device of claim 7, wherein the execution state information includes at least one of information about an application running in the electronic device, storage information of the memory, or calculation processing information of the processor.

9. The electronic device of claim 1, wherein the instructions further cause the processor to:
when the second application program is displayed on the display and the first application program is not displayed on the display, cause the second application program to have a priority higher than the first application program on the display.

10. The electronic device of claim 1,
wherein the display executes in a multi-window scheme in which both the first application and the second application operate in a foreground at a same time.

11. The electronic device of claim 1, wherein the list comprises a change target of a priority for resource use of a wireless communication resource.

12. The electronic device of claim 1, wherein the instructions further cause the processor to control the display to display a user interface for setting an application to be included in the list.

13. An electronic device comprising:
a display;
a wireless communication circuit;
a processor operatively connected to the display and the wireless communication circuit; and
a memory operatively connected to the processor and configured to store a first application program having a first priority associated with use of a resource of a wireless communication circuit,
wherein the memory stores instructions that cause the processor to:
execute the first application program,
when the first application program is displayed on the display, transmit identification information of the first application program to an external device through the wireless communication circuit, and receive a signal for determining whether the first application program has a low latency attribute, through the wireless communication circuit, wherein the signal includes information about a value of which the first priority is to be changed, and
increase a priority of the first application program to be higher than the first priority based at least partly on the signal.

14. The electronic device of claim 13, wherein the instructions further cause the processor to:
determine whether identification information of the first application program is included in an application list stored in the memory.

15. The electronic device of claim 13, wherein the instructions further cause the processor to:
when a screen associated with the first application program occupies the display by a specified range or more, determine the attribute.

* * * * *